United States Patent
Fukuchi et al.

[11] Patent Number: 5,645,901
[45] Date of Patent: Jul. 8, 1997

[54] ELECTRODE SUBSTRATE FOR LIQUID CRYSTAL DISPLAY DEVICE AND LIQUID CRYSTAL DISPLAY DEVICE

[75] Inventors: Shunsei Fukuchi, Nara; Makoto Iwamoto, Yamatokooriyama; Akihiro Kitabatake, Osaka; Masahiro Tanimoto, Daito; Masaki Maekawa, Takatsuki; Naoki Shimoyama, Otsu, all of Japan

[73] Assignees: Sharp Kabushiki Kaisha; Sanyo Vacuum Industries Co., Ltd.; Toray Industries, Inc., all of, Japan

[21] Appl. No.: 495,666

[22] PCT Filed: Dec. 8, 1994

[86] PCT No.: PCT/JP94/02067

§ 371 Date: Jul. 27, 1995

§ 102(e) Date: Jul. 27, 1995

[87] PCT Pub. No.: WO95/16936

PCT Pub. Date: Jun. 22, 1995

[30] Foreign Application Priority Data

Dec. 13, 1993 [JP] Japan ................... 5-342553

[51] Int. Cl.$^6$ .................................................. G02F 1/1333
[52] U.S. Cl. .................. 428/1; 428/447; 428/451; 349/158
[58] Field of Search ................. 359/82, 62; 428/1, 428/447, 451

[56] References Cited

FOREIGN PATENT DOCUMENTS

| | | |
|---|---|---|
| 0499492 | 8/1992 | European Pat. Off. . |
| 0503097 | 9/1992 | European Pat. Off. . |
| 0649047 | 4/1995 | European Pat. Off. . |
| 6011704 | 1/1994 | Japan . |

*Primary Examiner*—Alexander Thomas
*Attorney, Agent, or Firm*—Austin R. Miller

[57] ABSTRACT

An electrode substrate for liquid crystal display devices is constructed with a resin substrate 4, a cured coating 3, a cured coating 2 and an ITO film 6 laminated in that order. The resin substrate 4 comprises a transparent resin which is a copolymer containing not less than 20% by weight of maleimide type monomer units, having a crosslinked structure and having a glass transition temperature of not lower than 160° C. and not higher than 200° C., and has a thickness of 0.1 to 0.8 mm. The cured coating 3 is a cured coating comprising a polyvinyl alcohol crosslinked with an epoxysilane represented by the formula $R^1SiX_3$ wherein $R^1$ is an organic group of 1 to 10 carbon atoms having a glycidyl group and X is a hydrolyzable group. The cured coating 2 is a siloxane type cured coating containing fine silica particles. The ITO film 6 is an ITO film having a grainy surface with grains of a diameter of not larger than 500 nm, formed at a substrate temperature of not higher than 100° C., and having a thickness of 15 to 500 nm.

21 Claims, 2 Drawing Sheets

ELECTRODE SUBSTRATE FOR LIQUID CRYSTAL DISPLAY DEVICE AND LIQUID CRYSTAL DISPLAY DEVICE

TECHNICAL FIELD

The present invention relates to an electrode substrate for a liquid crystal display device and to a liquid crystal display device.

BACKGROUND ART

The use of transparent plastic materials as substrates for liquid crystal display devices instead of glass substrates is being studied. For example, the liquid crystal display device indicated in Japanese Unexamined Patent Publication No. 59-204545 has an electrode substrate comprising a 0.1–0.4 mm-thick thermoplastic resin [for example, PES (polyethersulfone), PMMA (polyethyl methacrylate), PC (polycarbonate) or PET (polyethylene terephthalate)] substrate, a 15 nm-thick $SiO_x$ undercoat film, a 20 nm-thick ITO transparent conductive film and an orientated directional film.

When the above-mentioned electrode substrate is introduced into the production process for an already existing liquid crystal display device in the same manner as a conventional glass substrate, the following problems occur.

1. In the alkali treatment and heat treatment processes following photoetching, cracks result in the $SiO_x$ undercoat film and ITO film, making further working impossible. Even if it is possible to fabricate a display device without such cracks, in reliability testing (high-temperature high-humidity preservation test, cooling/heating thermal shock test, etc.) cracks in the ITO film make, the ITO electrode broken, and cracks in the $SiO_x$ film generate air bubbles in the liquid crystal layer of the display section.

2. Since a thermoplastic resin is used, the rigidity (or "hardness") is insufficient even with a substrate with a thickness of 0.4 mm, and thus single-substrate-processing is difficult to perform in the same manner as for glass substrates. Furthermore, since the softening point of the substrate is about 100° C., deformation occurs during the heating and pasting processes, and it becomes impossible to obtain uniform cell gaps, thus resulting in display irregularities.

3. In cases where the gas barrier properties of the $SiO_x$ undercoat are unsatisfactory, gases such as $O_2$ and $H_2O$ permeate the liquid crystal layer, resulting in the creation of air bubbles.

DISCLOSURE OF THE INVENTION

It is an object of the present invention to provide a liquid crystal display device electrode substrate with excellent heat resistance, abrasion resistance, flatness and gas barrier properties, as well as a liquid crystal display device employing it.

The electrode substrate for liquid crystal display devices according to the present invention comprises the following layers A, B, C and E, laminated in that order.

Layer A: A resin substrate comprising a transparent resin of a copolymer containing not less than 20% by weight of maleimide type monomer units, having a crosslinked structure and having a glass transition temperature of not lower than 160° C. and not higher than 200° C., and with a thickness of 0.1 to 0.8 mm.

Layer B: A cured coating comprising a polyvinyl alcohol crosslinked with an epoxysilane represented by the general formula (1) and/or a hydrolysate thereof:

$$R^1SiX_3 \quad (1)$$

wherein $R^1$ is an organic group of 1 to 10 carbon atoms having a glycidyl group and X is a hydrolyzable group.

Layer C: A siloxane type cured coating containing fine silica particles.

Layer E: An ITO film having a grainy surface with grains of a diameter of not larger than 500 nm, formed at a substrate temperature of not higher than 100° C., and having a thickness of 15 to 500 nm.

This electrode substrate may also have the following layer D between the aforementioned layers C and E.

Layer D: A metal oxide film comprising a metal selected from Si, Al and Ti, formed at a substrate temperature of not higher than 100° C. and having a thickness of 10 to 200 nm.

The liquid crystal display device according to the present invention is provided with a pair of such electrode substrates which are oriented and with a liquid crystal layer created by injecting liquid crystals between the electrode substrates.

BEST MODE FOR CARRYING OUT THE INVENTION

Figure 1:
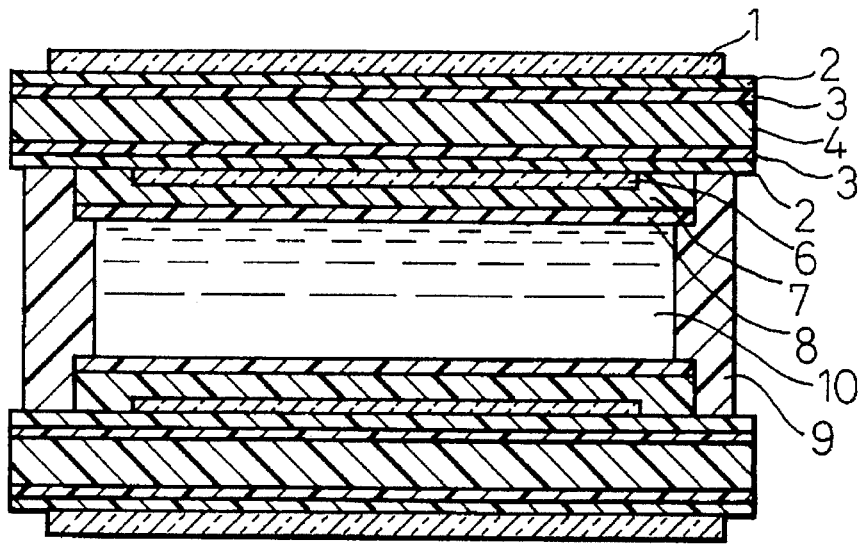
FIG. 1 is a vertical cross-sectional illustration showing an embodiment of a liquid crystal display device according to the present invention.

A concrete explanation of the present invention is provided below.

A. Resin substrate

The transparent resin of the present invention has a glass transition temperature of not lower than 160° C. and not higher than 200° C. The glass transition temperature is the temperature at which a macromolecule converts from an amorphous glassy state to a rubber state. Since the various properties including the elastic modulus, expansion coefficient, heat content, refractive index and dielectric constant change within the transition range, it is possible to measure the glass transition temperature by the changes in these properties. Specifically, the measurement may be made by a publicly known method such as differential scanning calorimetry (DSC) (for example, JIS K7121).

In cases where the glass transition temperature of the transparent resin is less than 160° C., this will result in insufficient heat resistance during the working processes required for the liquid crystal display device electrode substrate (in particular, insufficient heat resistance during the alignment film curing process and the substrate pasting process), thus making it impossible to perform working for production of the liquid crystal display device. On the other hand, resins with a glass transition temperature exceeding 200° C. have insufficient toughness, leading to cracks in the substrate which complicate its use.

The mechanical properties of the transparent resin, when expressed in terms of the flexural modulus at room temperature, are preferably 200 kg/mm² or greater, and more preferably 330 kg/mm² or greater. Furthermore, the transparency of the transparent resin, when expressed in terms of the total light transmittance of the resin without coloring, is preferably 60% or greater, and more preferably 80% or greater.

The transparent resin may also be constructed as a composite system with an inorganic material or the like, provided that its transparency is not impaired, and it may include inorganic bonds such as siloxane bonds or phosphazene bonds.

As transparent resins with glass transition temperatures of not lower than 160° C. and not higher than 200° C., there may be mentioned (i) polyolefin resins represented by polymethacrylic resins such as polymethacrylic acid and polycarboxyphenyl methacrylamide and polystyrene resins such as poly(biphenyl)styrene; (ii) polyether resins represented by poly(2,6-dimethyl-1,4-phenylene oxide); (iii) polycarbonate resins represented by poly(oxycarbonyloxy-1,4-phenyleneisopropylidene -1,4-phenylene); (iv) polyester resins represented by poly(oxy-2,2,4,4-tetramethyl-1,3-cyclobutyleneoxyterephthaloyl); (v) polysulfone resins represented by poly(oxy-1,4-phenylenesulfonyl-1,4-phenylene) and poly(oxy-1,4-phenyleneisopropylidene-1,4-phenyleneoxy -1,4-phenylenesulfonyl-1,4-phenylene); (vi) polyamide resins represented by poly (iminoisophthaloylimino-4,4'-biphenylene); (vii) polysulfide resins represented by poly(thio-1,4-phenylenesulfonyl -1,4-phenylene); (viii) unsaturated polyester resins; (ix) epoxy resins; (x) melamine resins; (xi) phenol resins; (xii) diallyl phthalate resins; (xiii) polyimide resins; and (xiv) polyphosphazene resins. Crosslinked structures may be introduced into these high molecular groups to obtain transparent crosslinked resins exhibiting the aforementioned thermal properties.

Polyolefin resins are particularly preferred from the viewpoint of transparency and moldability, and preferred for use are polyolefin copolymers obtained by copolymerizing a composition containing multifunctional monomer units with 2 or more unsaturated groups. The above-mentioned copolymer is preferably a copolymer containing 20 to 98% by weight of maleimide monomer units represented by the general formula (2) below and 2 to 80% by weight of multifunctional monomer units with 2 or more unsaturated groups, and is prepared by polymerizing a composition with a total weight percentage of not less than 30% by weight of the above-mentioned monomer units represented by the general formula (2) and the abovementioned multifunctional monomer units with 2 or more unsaturated groups.

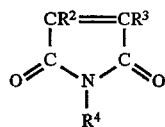

(2)

In the above formula, $R^2$ and $R^3$ each independently represent hydrogen, methyl or ethyl, and $R^4$ represents hydrogen or a hydrocarbon group of 1 to 20 carbon atoms. Specific examples of $R^4$ as a hydrocarbon group include (i) linear alkyl groups such as methyl, ethyl, propyl, octyl and octadecyl; (ii) branched alkyl groups such as isopropyl, sec-butyl, tert-butyl and isopentyl; (iii) alicyclic hydrocarbon groups such as cyclohexyl and methylcyclohexyl; (iv) aryl groups such as phenyl and methylphenyl; and (v) aralkyl groups such as benzyl and phenethyl. Also, the methyl and ethyl group of $R^2$ and $R_3$ and the hydrocarbon group of $R^4$ may be substituted with any of a variety of substituents including halogens such as fluorine, chlorine and bromine, cyano groups, carboxyl groups, sulfonate groups, nitro groups, hydroxy groups, alkoxy groups, etc.

Specific examples of compounds represented by general formula (2) include N-methylmaleimide, N-butylmaleimide, N-phenylmaleimide, N-o-methylphenylmaleimide, N-m-methylphenylmaleimide, N-p-methylphenylmaleimide, N-o-hydroxyphenylmaleimide, N-m-hydroxyphenylmaleimide, N-p-hydroxyphenylmaleimide, N-methoxyphenylmaleimide, N-m-methoxyphenylmaleimide, N-p-methoxyphenylmaleimide, N-o-chlorophenylmaleimide, N-m-chlorophenylmaleimide, N-p-chlorophenylmaleimide, N-o-carboxyphenylmaleimide, N-p-carboxyphenylmaleimide, N-p-nitrophenylmaleimide, N-ethylmaleimide, N-cyclohexylmaleimide and N-isopropylmaleimide. These monomer units may be used alone or in mixtures of 2 or more.

From the point of view of yellowing after heat resistance testing and weatherability, of the above maleimide compounds there are particularly preferred alkylmaleimides and cycloalkylmaleimides, and N-isopropylmaleimide and N-cyclohexylmaleimide are even more preferred. From the point of view of ease of preparation of the monomer solution for cast polymerization, the combined use of an N-alkylmaleimide and N-alicyclicalkylmaleimide, for example the combined use of N-isopropylmaleimide and N-cyclohexylmaleimide, is most preferred. The proportion of the N-alkylmaleimide and N-alicyclicalkylmaleimide when these are used in combination should be determined by appropriate experimentation, depending on the type and amounts of the multifunctional monomer units with 2 or more unsaturated groups. In order to bring out the effect of the combined use, the N-alicyclicmaleimide is preferably used at from 10 to 500 parts by weight to 100 parts by weight of the N-alkylmaleimide.

The multifunctional monomer units with 2 or more unsaturated groups are monomers with 2 or more unsaturated functional groups which are copolymerizable with the above-mentioned maleimide, and the copolymerizable functional groups may be vinyl, methylvinyl, acryl, methacryl or the like. They may also be monomers with 2 or more different copolymerizable functional groups per molecule.

B. Cured coating containing polyvinyl alcohol

The polyvinyl alcohol in the cured coating which is useful according to the present invention is preferably one with an average polymerization degree of 250 to 3000. If the average polymerization degree is less than 250, the resulting film will lack durability (particularly water resistance). Also, if it exceeds 3000, the viscosity will be too high after coating, thus leading to working problems such as inability to obtain a smooth coat.

The use of an epoxysilane and a curing agent in the cured coating is preferred from the standpoint of improving durability, adhesion with the transparent resin substrate, water resistance and the hydrochloric acid resistance necessary for etching after setting a conductive film. In addition, one or more types of epoxysilanes and curing agents may be added.

A compound represented by the general formula (1) above or a hydrolysate thereof is suitable as the epoxysilane.

Specific examples of such a compound include glycidoxy methyltrimethoxysilane, glycidoxy methyltriethoxysilane, α-glycidoxy ethyltrimethoxysilane, α-glycidoxy ethyltriethoxysilane, β-glycidoxy ethyltrimethoxysilane, β-glycidoxy ethyltriethoxysilane, α-glycidoxy propyltrimethoxysilane, α-glycidoxy propyltriethoxysilane, β-glycidoxy propyltrimethoxysilane, β-glycidoxy propyltriethoxysilane, γ-glycidoxy propyltrimethoxysilane, γ-glycidoxy propyltriethoxysilane, γ-glycidoxy propyltripropoxysilane, γ-glycidoxy propyltributoxysilane, γ-glycidoxy propyltriphenoxysilane, α-glycidoxy butyltrimethoxysilane, α-glycidoxy butyltriethoxysilane, β-glycidoxy butyltrimethoxysilane, β-glycidoxy butyltriethoxysilane, γ-glycidoxy butyltrimethoxysilane, γ-glycidoxy butyltriethoxysilane, δ-glycidoxy butyltrimethoxysilane, δ-glycidoxy butyltriethoxysilane, (3,4-epoxycyclohexyl) methyltrimethoxysilane, (3,4-epoxycyclohexyl) methyltriethoxysilane, β-(3,4-epoxycyclohexyl) ethyltrimethoxysilane, β-(3,4-epoxycyclohexyl) ethyltriethoxysilane, β-(3,4-epoxycyclohexyl) ethyltripropoxysilane, β-(3,4-epoxycyclohexyl) ethyltributoxysilane, β-(3,4-epoxycyclohexyl) ethyltriphenoxysilane, γ-(3,4-epoxycyclohexyl) propyltrimethoxysilane, γ-3,4-epoxycyclohexyl) propyltriethoxysilane, δ-(3,4-epoxycyclohexyl) butyltrimethoxysilane, δ-(3,4-epoxycyclohexyl) butyltriethoxysilane, and hydrolysates thereof. The cured coating containing the polyvinyl alcohol crosslinked with an epoxysilane may contain one or more of these epoxysilanes.

These epoxysilanes are preferably hydrolyzed for use in order to lower the curing temperature and further promote curing. The hydrolysate may be obtained by adding pure water or an acidic aqueous solution of hydrochloric acid, acetic acid, sulfuric acid or the like and stirring. The degree of hydrolyzation may be easily controlled by adjusting the amount of the pure water or acidic aqueous solution added. During the hydrolyzation, addition of pure water or acidic aqueous solution at from 1 to 3 molar equivalents with respect to the hydrolyzable group contained in the compound represented by general formula (1) is preferred from the point of view of promoting curing.

Alternatively, in order to produce alcohol, etc., during the hydrolyzation, the reaction may be carried out without a solvent. Also, for uniform hydrolyzation, it may be carried out after mixing the epoxysilane and the solvent. Depending on the purpose, an appropriate amount of the alcohol, etc., produced by the hydrolyzation may be removed by heating and/or under reduced pressure and used, and an appropriate solvent added thereafter.

A curing catalyst is preferably added to promote the curing reaction of the coating. Aluminum chelate compounds are suitable for use as curing catalysts. Examples thereof are aluminum chelate compounds represented by the general formula $AlX_nY_{3-n}$. In this formula, X is OL (where L represents a lower alkyl group of 1 to 6 carbon atoms), Y is at least one selected from ligands derived from compounds represented by $M^1COCH_2COM^2$ (where $M^1$ and $M^2$ both represent lower alkyl groups) and ligands derived from compounds represented by the general formula $M^3COCH_2COOM^4$ (where $M^3$ and $M^4$ are both lower alkyl groups of 1 to 6 carbon atoms), and n is 0, 1 or 2.

A number of different compounds may be mentioned as aluminum chelate compounds represented by this general formula, but from the point of view of stability and solubility in the composition and effect as curing catalysts, aluminum acetylacetonate, aluminum bisethylacetoacetate monoacetylacetonate, aluminum-di-n-butoxido -monoethylacetoacetate, aluminum-di-iso-propoxido -monomethylacetoacetate, etc., are particularly preferred. These aluminum chelate compounds may be used alone or in mixtures of 2 or more.

According to the present invention, for the purpose of improving the hardness, fine inorganic particles may also be added to the cured coating containing the polyvinyl alcohol crosslinked with the epoxysilane. The fine inorganic particles to be used here are not particularly restricted provided that the transparency of the substrate is not impaired. Colloidally dispersed sols are particularly preferred examples from the point of view of improving workability and maintaining transparency. As more specific examples there may be mentioned antimony oxide sols, silica sols, titania sols, zirconia sols, alumina sols and tungsten oxide sols. In order to improve the dispersability of the fine inorganic particles, any type of fine particle surface treatment or addition of surfactants or amines may be employed.

The amount of the fine inorganic particles to be added is not particularly limited, but for a more notable effect the transparent coating preferably contains the particles at not less than 1% by weight and not more than 80% by weight. At an amount of less than 1% by weight no clear effect of the addition will be realized. An amount greater than 80% by weight will lead to problems such as poor adhesion with the plastic substrate, cracking in the coating itself, and lower impact resistance.

The size of the fine inorganic particles is not particularly limited, but is preferably 1 to 200 nm, and more preferably 5 to 100 nm. In cases where the average particle size is not at least about 1 nm, the stability of the dispersion is poor, and the quality is not stable. In cases where the average particle size exceeds 200 nm, the transparency of the resulting film is poor, and there is a high degree of clouding.

The means of applying the cured coating on the resin substrate may be a common means of application such as brush coating, immersion coating, roll coating, spray coating, flow coating, or the like.

C. Siloxane type cured coating

The siloxane type cured coating is a cured coating containing fine silica particles and a silicone type macromolecule. Other macromolecules may be added to the cured coating, and three-dimensional crosslinking may also be performed using a curing agent or crosslinking agent. In consideration of the properties such as surface harness, heat resistance, chemical resistance and transparency, the silicone type macromolecule is preferably a polymer obtained from either an organic silicon compound represented by the following general formula (3) or a hydrolysate thereof.

$$R^5_a R^6_b SiX_{4-a-b} \qquad (3)$$

wherein $R^5$ is an organic group of 1 to 10 carbon atoms, $R^6$ is a hydrocarbon group or halogenated hydrocarbon group of 1 to 6 carbon atoms, X is a hydrolyzable group, and a and b are 0 or 1.

Examples of organic silicon compounds represented by general formula (3) include tetraalkoxysilanes such as methyl silicate, ethyl silicate, n-propyl silicate, isopropyl silicate, n-butyl silicate, sec-butyl silicate, t-butyl silicate, and hydrolysates thereof; trialkoxysilanes, triacyloxysilanes and triphenoxysilanes such as methyltrimethoxysilane, methyltriethoxysilane, methyltriacetoxysilane, methyltripropoxysilane, methyltributoxysilane, ethyltrimethoxysilane, ethyltriethoxysilane, vinyltrimethoxysilane, vinyltriethoxysilane, vinyltriacetoxysilane, phenyltrimethoxysilane, phenyltriethoxysilane, phenyltriacetoxysilane, γ-chloropropyltrimethoxysilane, γ chloropropyltriethoxysilane, γ-chloropropyltriacetoxysilane, γ-methacryloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ aminopropyltrimethoxysilane, β-cyanoethyltriethoxysilane, methyltriphenoxysilane, chloromethyltrimethoxysilane, chloromethyltriethoxysilane, glycidoxy methyltrimethoxysilane, glycidoxy methyltriethoxysilane, αglycidoxy ethyltrimethoxysilane, α-glycidoxy ethyltriethoxysilane, β-glycidoxy ethyltrimethoxysilane, β-glycidoxy ethyltriethoxysilane, α-glycidoxy propyltrimethoxysilane, α-glycidoxy propyltriethoxysilane, β-glycidoxy propyltrimethoxysilane, β-glycidoxy propyltriethoxysilane, γ-glycidoxy propyltrimethoxysilane, γ-glycidoxy propyltriethoxysilane, γ-glycidoxy propyltripropoxysilane, γ-glycidoxy propyltributoxysilane, γ-glycidoxy propyltriphenoxysilane, α-glycidoxy butyltrimethoxysilane, α-glycidoxy butyltriethoxysilane, β-glycidoxy butyltrimethoxysilane, β-glycidoxy butyltriethoxysilane, γ-glycidoxy butyltrimethoxysilane, γ-glycidoxy butyltriethoxysilane, δ-glycidoxy butyltrimethoxysilane, δ-glycidoxy butyltriethoxysilane, (3,4-epoxycyclohexyl) methyltrimethoxysilane, (3,4-epoxycyclohexyl) methyltriethoxysilane, β-(3,4-epoxycyclohexyl) ethyltrimethoxysilane, β-(3,4-epoxycyclohexyl) ethyltriethoxysilane, β-(3,4-epoxycyclohexyl) ethyltripropoxysilane, β-(3,4-epoxycyclohexyl) ethyltributoxysilane, β-(3,4-epoxycyclohexyl) ethyltriphenoxysilane, γ-(3,4-epoxycyclohexyl) propyltrimethoxysilane, γ-3,4-epoxycyclohexyl) propyltriethoxysilane, δ-(3,4-epoxycyclohexyl) butyltrimethoxysilane, δ-(3,4-epoxycyclohexyl) butyltriethoxysilane, and hydrolysates thereof; and dialkoxysilanes, diphenoxysilanes and diacyloxysilanes such as dimethyldimethoxysilane, phenylmethyldimethoxysilane, dimethyldiethoxysilane, phenylmethyldiethoxysilane, γ-chloropropylmethyldimethoxysilane, γ-chloropropylmethyltriethoxysilane, dimethyldiacetoxysilane, γ-methacryloxy propylmethyldimethoxysilane, γ-methacryloxy propylmethyldiethoxysilane, γ-mecaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, methylvinyldiethoxysilane, glycidoxy methylmethyldimethoxysilane, glycidoxy methylmethyldiethoxysilane, α-glycidoxy ethylmethyldimethoxysilane, α-glycidoxy ethylmethyldiethoxysilane, β-glycidoxy ethylmethyldimethoxysilane, β-glycidoxy ethylmethyldiethoxysilane, α-glycidoxy propylmethyldimethoxysilane, α-glycidoxy propylmethyldiethoxysilane, β-glycidoxy propylmethyldimethoxysilane, β-glycidoxy propylmethyldiethoxysilane, γ-glycidoxy propylmethyldimethoxysilane, γ-glycidoxy propylmethyldiethoxysilane, γ-glycidoxy propylmethyldipropoxysilane, γ-glycidoxy propylmethyldibutoxysilane, γ-glycidoxy propylmethylmethoxyethoxysilane, γ-glycidoxy propylmethyldiphenoxysilane, γ-glycidoxy propylmethyldiacetoxysilane, γ-glycidoxy propylethyldimethoxysilane, γ-glycidoxy propylethydiethoxysilane, γ-glycidoxy propylvinyldimethoxysilane, γ-glycidoxy propylvinyldiethoxysilane, γ-glycidoxy propylphenyldimethoxysilane, γ-propylphenyldiethoxysilane, and hydrolysates thereof. Any one or more of these organic silicon compounds may be added.

To the coating-forming composition consisting mainly of the silicone resin there may also be added, in addition to the silicon resin, an acrylic resin, polyurethane resin, epoxy resin, melamine resin, polyolefin resin, cellulose, polyvinyl alcohol resin, urea resin, nylon resin, polycarbonate resin, or the like. The additional resins are not particularly limited provided that they do not impair the transparency and that sufficient surface hardness is achieved.

These organic silicon compounds are preferably hydrolyzed for use in order to lower the curing temperature and further promote curing. The hydrolyzation may be carried out by adding pure water or an acidic aqueous solution of hydrochloric acid, acetic acid, sulfuric acid or the like and stirring. The degree of hydrolyzation may be easily controlled by adjusting the amount of the pure water or acidic aqueous solution added. During the hydrolyzation, addition of pure water or acidic aqueous solution at from 1 to 3 molar equivalents with respect to the hydrolyzable group contained in the compound represented by the above general formula (3) is preferred from the point of view of promoting curing.

Alternatively, in order to produce alcohol, etc., during the hydrolyzation, the reaction may be carried out without a solvent. Also, for uniform hydrolyzation, it may be carried out after mixing the organic silicon compound and the solvent. Depending on the purpose, an appropriate amount of the alcohol, etc., produced by the hydrolyzation may be removed by heating and/or under reduced pressure and used, and an appropriate solvent added thereafter.

Fine silica particles may also be added to the siloxane type cured coating for the purpose of improving the surface hardness, adjusting the refractive index, improving the mechanical strength, improving the thermal properties, etc. Fine silica particles are useful with no particular restrictions provided that the transparency is not impaired when in a film state. Colloidally dispersed sols are particularly preferred examples from the point of view of improving workability and imparting transparency. In order to improve the dispersability of the fine silica particles, any type of fine particle surface treatment or addition of surfactants or amines may be employed.

The amount of the fine silica particles to be added is not particularly limited, but for a more notable effect the transparent coating preferably contains the particles at not less than 1% by weight and not more than 80% by weight. At an amount of less than 1% by weight no clear effect of the addition will be realized. On the other hand, an amount greater than 80% by weight will lead to problems such as poor adhesion with the plastic substrate, cracking in the coating itself, and lower impact resistance.

The size of the fine silica particles is not particularly limited, but is preferably 1 to 200 nm, and more preferably 5 to 100 nm. In cases where the average particle size is not at least about 1 nm, the stability of the dispersion is poor, and the quality is not stable. In cases where the average particle size exceeds 200 nm, the transparency of the resulting film is poor, and there is a high degree of clouding.

Any of a variety of curing agents may be used in combination with the coating composition for forming the siloxane type cured coating, in order to promote curing and allow low temperature curing, etc. Useful curing agents include various epoxy resin curing agents and organic silicon resin curing agents. Specific examples of curing agents are (1) various organic acids and their acid anhydrides, (2) nitrogen-containing organic compounds, (3) various metal complex compounds (4) metal alkoxides, (5) organic carboxylic acid salts and carbonic acid salts and peroxides of alkali metals, and (6) radical polymerization initiators such as azobisisobutyronitrile. These curing agents may also be used in combinations of 2 or more. Of these curing agents, the aluminum chelate compounds indicated below are particularly useful from the point of view of stability of the coating composition and coloring of the film after coating.

For example, preferred for use are aluminum chelate compounds represented by the general formula $AlX_nY_{3-n}$. In this formula, X is OL (where L represents a lower alkyl group of 1 to 6 carbon atoms), Y is at least one selected from ligands derived from compounds represented by $M^1COCH_2COM^2$ (where $M^1$ and $M^2$ both represent lower alkyl groups of 1 to 6 carbon atoms) and ligands derived from compounds represented by the general formula $M^3COCH_2COOM^4$ (where $M^3$ and $M^4$ are both lower alkyl groups of 1 to 6 carbon atoms), and n is 0, 1 or 2.

A number of different compounds may be mentioned as aluminum chelate compounds represented by this general formula, but from the point of view of solubility and stability in the composition and effect as curing catalysts, aluminum acetylacetonate, aluminum bisethylacetoacetate monoacetylacetonate, aluminum-di-n-butyoxido-monoethylacetoacetate, aluminum-di-iso-propoxido-monomethylacetoacetate, etc., are particularly preferred. These aluminum chelate compounds may be used alone or in mixtures of 2 or more.

The siloxane type cured coating may be obtained by curing the above-mentioned coating composition, and the curing is accomplished by heat treatment. The heating temperature may be appropriately selected with consideration to the composition of the coating composition and the heat resistance of the transparent crosslinked resin, and it is preferably 50°–250° C.

The means of applying the coating on the coating resin substrate may be a common means of application such as brush coating, immersion coating, roll coating, spray coating, spin coating, flow coating, or the like.

D. Metal oxide film

The metal oxide film formed on the substrate with the cured coating preferably comprises an oxide of a metal selected from Si, Al and Ti. The thickness of the metal oxide film is preferably 10 to 200 nm, and more preferably 10 to 120 nm, from the point of view of masking the substrate surface and providing adhesion with the ITO film.

In addition, from the point of view of minimizing deformity in the substrate at normal temperature after formation of the metal oxide film, due to differences between the thermal expansion coefficient of the metal oxide film and the thermal expansion coefficient of the substrate with the cured coating, the substrate temperature conditions during formation of the metal oxide film are preferably at low temperatures of as close to normal temperature as possible, and preferably 100° C. or lower.

E. ITO film

The method of forming the ITO (Indium Tin Oxide) film on the substrate with the metal oxide film may be vacuum deposition, ion plating, direct current, magnetron system sputtering, or the like.

The thickness of the ITO film is not particularly limited, but is preferably within the range of 15 to 500 nm in consideration of the relationship between the resistance value and the film formation time.

Figure 3:
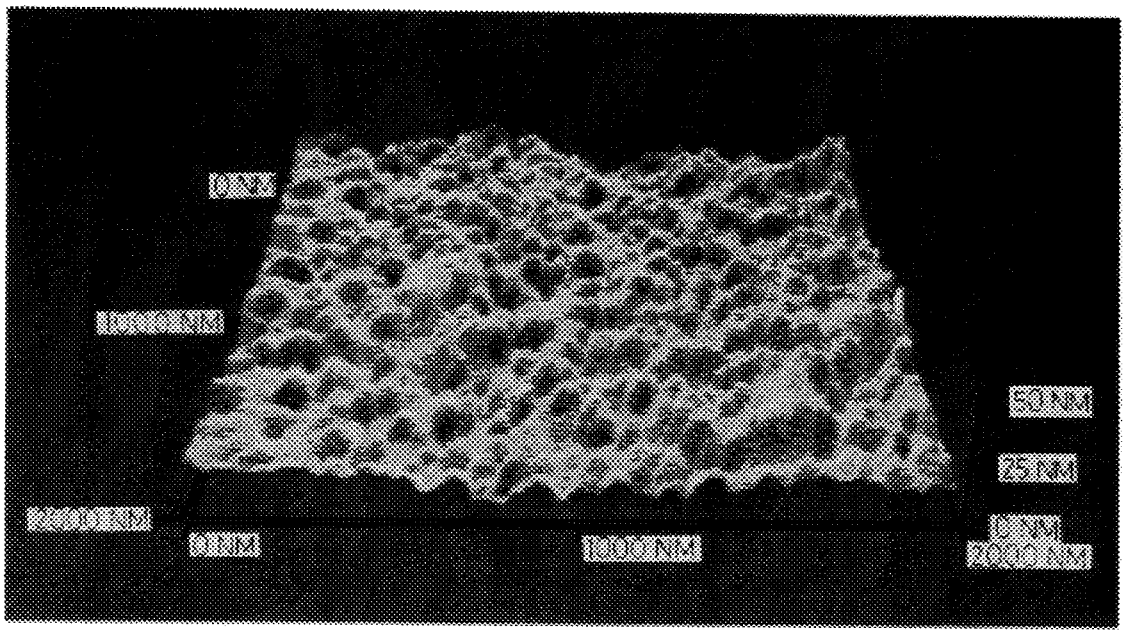
FIG. 3 is a photograph of the surface particle structure of the ITO film obtained in Example 1.

The surface structure of the ITO film is preferably grainy in consideration of the durability of the ITO film. Graininess refers to a structure in which morphological observation with an electron microscope or atomic force microscope reveals a grain boundary in the ITO film surface such as shown in FIG. 3. The grains preferably have a diameter of not more than 500 nm.

The substrate temperature conditions during formation of the ITO film are preferably not higher than 100° C., from the point of view of minimizing deformity in the substrate at normal temperature after formation of the ITO film (substrate deformities which create raised areas in the ITO surface) due to differences in the thermal expansion coefficients of the substrate and the ITO film.

F. Liquid crystal display device

The electrode substrate for liquid crystal display devices is obtained by forming the above-mentioned cured coating containing a polyvinyl alcohol for improved gas barrier properties, the above-mentioned siloxane type cured coating containing fine silica particles for an improved hard coat effect, and the above-mentioned metal oxide film and ITO film for improved adhesion under temperature conditions of not more than 100° C. in order to minimize substrate deformities, in that order on the above-mentioned resin substrate comprising a transparent resin with a crosslinked structure. This type of substrate provides transparency, heat resistance, gas barrier properties, abrasion resistance and substrate deformity control.

Nevertheless, in cases where the results of reliability evaluation are satisfactory, the metal oxide film may be omitted from the structure.

In cases where the above-mentioned electrode substrate is to be given a transparent conductive film, its thickness is preferably 0.1 to 5 mm, in consideration of the mechanical characteristics. Also, in cases where it is to be used for a liquid crystal display, it is more preferably 0.1 to 0.8 mm thick. This is because at less than 0.1 mn the form retention is inadequate, and at greater than 0.8 mm the thinness and lightweight effects are reduced.

This electrode substrate for liquid crystal display devices is suitable to be used for liquid crystal displays of the (i) simple matrix type such as TN (Twisted Nematic) type, STN (Super Twisted Nematic) type and FLC (Ferroelectric Liquid Crystal) type, (ii) PD (Polymer Dispersion) type, and (iii) active matrix type such as MIM (Metal-Insulator-Metal) type and TFT (Thin-Film Transistor) type, etc. Since the production process for the electrode substrate is relatively simple, it is preferably used for simple matrix type liquid crystal displays.

A publicly known method may be employed for producing a liquid crystal display device using the electrode substrate for liquid crystal display devices according to the present invention. For example, in the case of simple matrix liquid crystal displays [see Liquid Crystal Device Handbook (Japan Society for the Promotion of Science, 142nd Committee Edition, published by Nikkan Kogyo Shinbun Co., 1989), p.531], liquid crystal display devices are obtained by a process including a substrate washing step, a transparent conductive film forming step, a transparent conductive film patterning (resist application, development, etching and resist washing and removal) step, an alignment film forming step, a rubbing treatment step, a washing step, a sealant printing step, a substrate pasting step, a heating/pressing step, a vacuum deairing step, a liquid crystal injection step, an injection hole sealing step, a liquid crystal cell segmenting step, and a polarization plate/reflection plate pasting step, in that order. In these steps for producing a liquid crystal display device, the conditions should be set in consideration of the various properties of the electrode substrate for the liquid crystal display device, such as heat resistance and mechanical characteristics.

A particularly preferred method of producing a liquid crystal display device is given below.

An electrode substrate according to the present invention is washed and coated with a photoresist to a thickness of 1–3 μm by a roll coat system, and then prebaked for a few minutes at 80°–130° C. After this, it is exposed to light using a desired photomask. The developing solution used is a 0.6% wt % aqueous NaOH solution (25° C.). The amount of exposure and developing time, etc., are set for optimum conditions based on the sensitivity of the photoresist, the prebaking conditions, and so on.

After development, the ITO film is etched with a 3–8.6 N aqueous HBr solution (30°–45° C.) and the photoresist is washed and removed using a 3 wt % aqueous NaOH solution (30° C.), to obtain a transparent conductive film electrode substrate.

On the substrate on which is formed the transparent conductive film electrode pattern, there is printed a silica coating material to a thickness of 50–150 nm by offset printing, and firing is performed at 150°–170° C. with a peak at 60 minutes to form a top coat. This top coat prevents leakage due to conductive impurities between the ITO film and the pasted upper and lower substrates.

At the same time as the top coat formation, an alignment film material, such as polyimide, is printed over the top coat film by offset printing to a film thickness of 30–60 nm, and firing is performed at 150°–170° C. with a peak at 90 minutes to form an alignment film. In addition, the alignment film is rubbed in a fixed direction with a chemical fiber fabric of a fixed fiber hair length, to create a minute physical flaw. However, the alignments are different for the upper and lower substrates (the segment substrate and common substrate), and the cross angle of the rubbing direction is changed depending on the electrooptical properties demanded. The piece is then washed with warm water at 40°–50° C. and subjected to the following process.

On the upper substrate (segment substrate) a thermosetting epoxy-type seal material is printed in a prescribed pattern by screen printing. Meanwhile, on the lower substrate (common substrate), plastic beads are distributed in a uniform dispersion as spacers to maintain the thickness of the liquid crystal layer. The substrates are then pasted together in such a manner that the upper and lower electrode patterns match for the prescribed position finishing. The piece is then subjected to hot pressing at a pressure of $7.8 \times 10^4$–$1.5 \times 10^5$ Pa (0.8–1.5 kgf/cm$^2$) and a temperature of 100°–140° C., and the seal is hardened at 140°–160° C. As a result there is obtained a container-shaped cell formed by the pair of substrates held together by the sealing, except at the injection hole. This cell is set in an injector and subjected to vacuum suction, the cell injection hole is immersed in liquid crystals in the vacuum system, and the liquid crystals are injected by the differential pressure upon return to atmospheric pressure.

After the cell is filled with the liquid crystals, the cell injection hole is sealed with a UV-curing epoxy material. A roller is used to paste a polarization plate with a prescribed angle on the cell which has been surface treated on both sides, to obtain the liquid crystal display device shown in FIG. 1. However, if a metal oxide film is used the result is as shown in FIG. 2.

Figure 2:
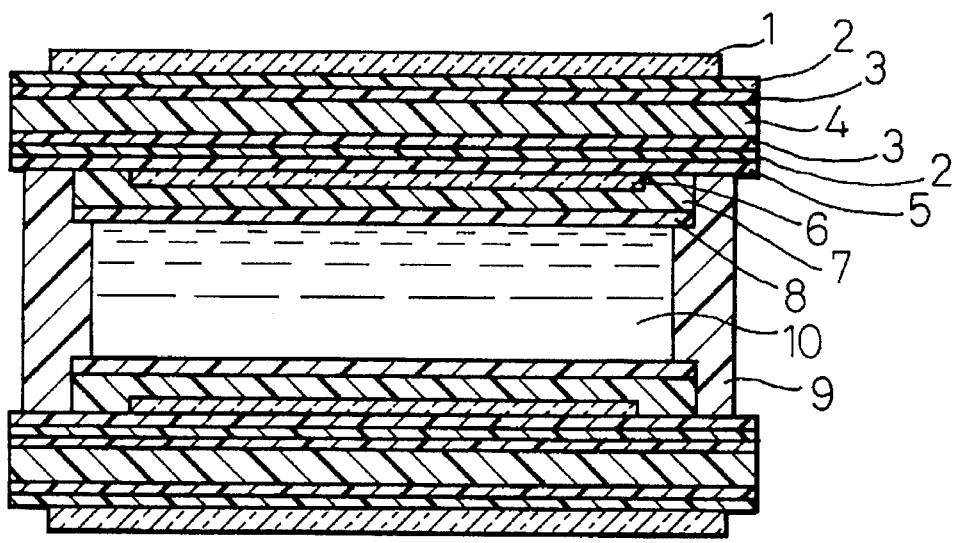
FIG. 2 is a vertical cross-sectional illustration showing another embodiment of a liquid crystal display device according to the present invention.

In FIGS. 1 and 2, 1 is a polarization plate, 2 is a siloxane type cured coating containing fine silica particles, 3 is a cured coating containing a polyvinyl alcohol, 4 is a transparent crosslinked resin substrate, 5 is a metal oxide film, 6 is an ITO transparent conductive film electrode, 7 is a top coat, 8 is a directional film, 9 is a seal, and 10 is a liquid crystal layer.

The present invention will now be explained more fully by way of the following examples.

EXAMPLE 1

(1) Fabrication of resin substrate

First, a resin substrate made of a transparent resin with a crosslinked structure was obtained by mixing

| | |
|---|---|
| Isopropylmaleimide | 26.5 g |
| Styrene | 18.5 g |
| Divinylbenzene | 5.0 g | to dissolution and then cast molding by cast polymerization. The cast polymerization was performed in the following manner. That is, soft vinyl chloride gaskets were pasted around the outer periphery of 2 glass plates with a size of 300 mm×300 mm and a thickness of 5 mm, and the 2 glass plates were assembled so as to leave a distance of 0.4 mm between them. The abovementioned monomer unit mixture was injected into the assembled glass plates, and polymerization was performed at 70° C. for 8 hours, at 100° C. for 1 hour, and further at 150° C. for 1 hour to obtain a molded plate comprising a transparent resin with a crosslinked structure (hereunder referred to as substrate (Ia)).

The glass transition temperature of this glass substrate (Ia) was 180° C., the total light ray transmittance was 90%, the elastic modulus at room temperature was 398 kg/mm$^2$, the flexural strength was 9 kg/mm$^2$, and the solvent resistance was satisfactory.

(2) Fabrication of cured coating containing polyvinyl alcohol crosslinked with epoxysilane (a) Preparation of ROM composition (B-1)

A 95.3 g portion of γ-glycidoxy propyltrimethoxysilane was charged into a reactor equipped with a rotor, the temperature of the liquid was kept at 10° C., and 21.8 g of a 0.01N aqueous solution of hydrochloric acid was gradually added thereto dropwise while stirring with a magnetic stirrer. After completion of the dropwise addition, the cooling was stopped to obtain a hydrolysate of γ-glycidoxy propyltrimethoxysilane.

A 5 g portion of this hydrolysate was added to 90 g of a 50 wt % aqueous solution of polyvinyl alcohol, and then 260 g of water, 50 g of 1,4-dioxane, 116.7 g of methanol and 5 g of aluminum acetylacetonate were further added while stirring, and adequately mixed to make a coating composition (B-1).

(b) Application and curing

The above-mentioned coating composition (B-1) was applied onto the substrate (Ia) by immersing the substrate (Ia) in the coating composition (B-1), and this was then precured at 100° C. for 5 minutes and further heated at 140° C. for 2 hours. In this manner, a cured coating containing polyvinyl alcohol crosslinked with epoxysilane was formed on the molded substrate (Ia), to obtain a coated substrate (Ib).

(3) Siloxane type cured coating containing fine silica particles (a) Preparation of coating composition (C-1)

A 91.1 g portion of γ-glycidoxy propylmethyldimethoxysilane was charged into a reactor equipped with a rotor, the temperature of the liquid was kept at 10° C., and 13.2 g of a 0.05N aqueous solution of hydrochloric acid was gradually added thereto dropwise while stirring with a magnetic stirrer. After completion of the dropwise addition, the cooling was stopped to obtain a hydrolysate of γ-glycidoxy propylmethyldimethoxysilane.

To this hydrolysate there were added and mixed 178.1 g of n-propyl alcohol, 29.7 g of benzyl alcohol, 59.6 g of diacetone alcohol, 23.7 g of acetyl acetone, 1.3 g of a surfactant and 64.0 g of bisphenol-A type epoxy resin, and then 426.5 g of colloidal silica sol and 7.5 g of aluminum acetylacetonate were added and adequately stirred to make a coating composition (C-1).

(b) Application and curing

The above-mentioned coating composition (C-1) was applied onto the substrate (Ib) by immersing the substrate (Ib) in the coating composition (C-1), and this was then precured at 100° C. for 10 minutes and further heated at 110° C. for 4 hours. In this manner, there was obtained a substrate (Ic) with a transparent cured coating (siloxane type cured coating) on the substrate (Ib).

(4) Formation of ITO film

Magnetron sputtering was used for the formation of the ITO transparent conductive film. The sputtering apparatus used was one in which magnetron targets are situated at the outer periphery of a cylindrical bell jar, and the sputtering gas is introduced through an introduction hole situated near the targets. In this apparatus, targets of three different materials may be situated at the outer periphery of the bell jar, and films of different materials for the $SiO_x$ film and ITO film may be formed successively while maintaining the vacuum.

Here, a voltage was applied to the targets for sputtering while maintaining the inside of the bell jar at a prescribed degree of vacuum. Also, the substrate on which the film was being formed was mounted on a substrate-holding jig positioned in the bell jar, and the front side of the target was rotated at a fixed speed during the sputtering. A substrate-heating heater placed on the inner wall of the bell jar kept the substrate at a constant temperature during the sputtering.

The sputtering conditions were as follows:

| | |
|---|---|
| ITO film thickness | 200 nm |
| Target material | ITO (In + Sn oxide sinter) |
| Introduced gas | Ar and $O_2$ |
| Sputter vacuum degree | $2.67 \times 10^{-1}$ Pa ($2.0 \times 10^{-3}$ Torr) |
| Making current | 3.0 kW |
| Substrate temperature | 100° C. |
| Sputtering rate | 6 nm/min |

FIG. 3 shows the results of observation of the ITO film surface of the obtained liquid crystal display device electrode substrate (Ie), using an atomic force microscope. As is clear from FIG. 3, the surface of the ITO film was grainy. Also, although the ITO surface of the liquid crystal display device electrode substrate (Ie) exhibited some small concave deformity, it had satisfactory carryability on the roller system of the liquid crystal display device production line.
Comparison 1

A film was formed under the same treatment conditions as in Example 1, except that the temperature of the substrate during formation of the ITO film was 130° C., to fabricate an electrode substrate (IIe) for a liquid crystal display device.

The obtained liquid crystal display device electrode substrate (IIe) exhibited large convex deformities in the center of the ITO film of as much as at least 30 mm more than the outer periphery. Upon evaluation of the carryability of the substrate (IIe) in a roller system, the substrate (IIe) created problems in being carried by getting caught between the rolls.

EXAMPLE 2

A metal oxide film ($SiO_x$) and ITO film were successively formed on the substrate obtained in Example 1(Ic) using a sputtering apparatus under the treatment conditions shown below, to fabricate an electrode substrate (IIIe) for a liquid crystal display device.

| Formation of metal oxide film | |
|---|---|
| Metal oxide film thickness | $SiO_x$ 20 nm |
| Target material | $SiO_2$ |
| Introduced gas | Ar and $O_2$ |
| Sputter vacuum degree | $1.33 \times 10^{-1}$ Pa ($1.0 \times 10^{-3}$ Torr) |
| Making current | 0.3 kW |
| Substrate temperature | 100° C. |
| Sputtering rate | 1 nm/min |
| Formation of ITO film | |
| ITO film thickness | 200 nm |
| Target material | ITO (In + Sn oxide sinter) |
| Introduced gas | Ar and $O_2$ |
| Sputter vacuum degree | $2.67 \times 10^{-1}$ Pa ($2.0 \times 10^{-3}$ Torr) |
| Making current | 3.0 kW |
| Substrate temperature | 100° C. |
| Sputtering rate | 6 nm/min |

Although the liquid crystal display device electrode substrate (IIIe) exhibited some small concave deformity on the ITC) surface, it had satisfactory carryability on a roller system.

EXAMPLE 3

A liquid crystal display device was fabricated according to the following method, using the liquid crystal display device electrode substrate obtained in Example 1 (Ie).

After the liquid crystal display device electrode substrate (Ie) was washed, it was coated with photoresist to a thickness of 2 μm using a roll coater, and prebaked at 100° C. A photomask was then used for light exposure. The photoresist was developed using a 0.6 wt % aqueous NaOH solution at a solution temperature of 25° C., and after etching of the ITO film using an 8.6N aqueous HBr solution at 40° C., the photoresist was peeled off using a 3.0 wt % aqueous NaOH solution at 30° C., and patterning was performed.

A silica coating material was printed on the patterned liquid crystal display device electrode substrate (Ie) by offset printing to a film thickness of 80 nm, and heated at 150° C. for 60 minutes to form a top coat film.

A directional film material was printed on the top coat film by offset printing to a film thickness of 40 nm and fired at 150° C. for 90 minutes, in the same manner as for the top coat film, to form an alignment film.

The alignment film was rubbed in a fixed direction with a chemical fiber fabric of a fixed fiber hair length, to create a minute physical flaw. The directions were different for the upper and lower substrates (the segment substrate and common substrate). After the rubbing, the upper and lower substrates were washed with warm water at 40° C.

Next, a thermosetting epoxy-type seal material was printed on the upper substrate in a prescribed pattern by screen printing. Meanwhile, plastic beads were distributed in a uniform dispersion as spacers to maintain the thickness of the liquid crystal layer on the lower substrate. The substrates were then pasted together in such a manner that the upper and lower electrode patterns matched at the prescribed positions. The piece was then subjected to hot pressing at a pressure of $1.18 \times 10^5$ Pa (1.2 kgf/cm$^2$) and a temperature of 140° C., and the seal was hardened at 140° C. Thus, the pair of electrode substrates were made into a container shape sealed except at the injection hole.

The cell with the form described above was set in an injector and subjected to vacuum suction. The cell injection hole was immersed in liquid crystals in the vacuum system, and upon return to atmosphere pressure the liquid crystals were injected by the differential pressure. After the cell was filled with the liquid crystals, it was sealed with a UV-curing epoxy material.

A roller was then used to paste a polarization plate with a prescribed angle on the cell which had been filled with the liquid crystals between the substrates, to obtain the liquid crystal display device shown in FIG. 1.

The liquid crystal display device (STN type) obtained by the above method was capable of providing a clear dot display.

EXAMPLE 4

A liquid crystal display device such as shown in FIG. 2 was fabricated by the same method as in Example 3, using the substrate obtained in Example 2 (IIIe).

The obtained liquid crystal display device (STN type) was capable of providing a clear dot display.

EXAMPLE 5

(1) Fabrication of resin substrate

First, a substrate made of a transparent resin with a crosslinked structure was obtained by mixing

| | |
|---|---|
| Isopropylmaleimide | 23.5 g |
| Cyclohexylmaleimide | 5.0 g |
| Styrene | 15.5 g |
| Divinylbenzene | 6.0 g | to dissolution and then cast molding by cast polymerization. The cast polymerization was performed in the following manner. That is, soft vinyl chloride gaskets were pasted around the outer periphery of 2 glass plates with a size of 300 mm×300 mm and a thickness of 5 mm, and the 2 glass plates were assembled so as to leave a distance of 0.4 mm between them. The abovementioned monomer unit mixture was injected into the assembled glass plates, and polymerization was performed at 70° C. for 8 hours, at 100° C. for 1 hour, and further at 150° C. for 1 hour to obtain a molded plate comprising a transparent resin with a crosslinked structure (hereunder referred to as substrate (IVa)).

The glass transition temperature of this glass substrate (IVa) was 180° C., the total light ray transmittance was 90%, the elastic modulus at room temperature was 398 kg/mm$^2$, the flexural strength was 9 kg/mm$^2$, and the solvent resistance was satisfactory.

(2) Fabrication of cured coating containing polyvinyl alcohol (a) Preparation of coating composition (B-2)

A 95.3 g portion of γ-glycidoxy propyltrimethoxysilane was charged into a reactor equipped with a rotor, the temperature of the liquid was kept at 10° C., and 21.8 g of a 0.01N aqueous solution of hydrochloric acid was gradually added thereto dropwise while stirring with a magnetic stirrer. After completion of the dropwise addition, the cooling was stopped to obtain a hydrolysate of γ-glycidoxy propyltrimethoxysilane.

To 5 g of this hydrolysate there were added and mixed 90 g of a 50% by weight aqueous solution of polyvinyl alcohol, 260 g of water while stirring, 50 g of 1,4-dioxane and 5 g of aluminum acetylacetonate. There were further added 166.7 g of colloidal silica sol and 5 g of aluminum acetylacetonate and the mixture was adequately stirred to make a coating composition (B-2).

(b) Application and curing

The coating composition (B-2) was applied onto the substrate (IVa) obtained in (2)-(a) above by immersing the substrate (IVa) in the coating composition (B-2), and this was then precured at 100° C. for 5 minutes and further heated at 140° C. for 2 hours. In this manner, there was obtained a substrate (IVb) consisting of the molded substrate (IVa) with a transparent cured coating containing a polyvinyl alcohol crosslinked with an epoxysilane.

(3) Siloxane type cured coating containing fine silica particles (a) Preparation of coating composition (C-2)

A 91.1 g portion of γ-glycidoxy propylmethyldimethoxysilane was charged into a reactor equipped with a rotor, the temperature of the liquid was kept at 10° C., and 13.2 g of a 0.05N aqueous solution of hydrochloric acid was gradually added thereto dropwise while stirring with a magnetic stirrer. After completion of the dropwise addition, the cooling was stopped to obtain a hydrolysate of γ-glycidoxy propylmethyldimethoxysilane.

To this hydrolysate there were added and mixed 178.1 g of n-propyl alcohol, 29.7 g of benzyl alcohol, 59.6 g of diacetone alcohol, 23.7 g of acetyl acetone, 1.3 g of a surfactant and 64.0 g of a bisphenol-A type epoxy resin, and then 426.5 g of colloidal silica sol and 7.5 g of aluminum acetylacetonate were added and adequately stirred to make a coating composition (C-2).

(b) Application and curing

The above-mentioned coating composition (C-2) was applied onto the substrate (IVb) by immersing the substrate (IVb) in the coating composition (C-2), and this was then precured at 100° C. for 10 minutes and further heated at 110° C. for 4 hours. In this manner, there was obtained a substrate (IVc) with a transparent cured coating (siloxane type cured coating) on the substrate (IVb).

(4) Formation of ITO film

An ITO film was formed on the above-mentioned substrate (IVc) under the same conditions as in Example 1, to fabricate an electrode substrate (IVe) for a liquid crystal display device.

Observation of the ITO film surface with an atomic force microscope after the formation confirmed that the surface of the ITO film was grainy. Also, although the liquid crystal display device electrode substrate (IVe) exhibited some small concave deformity on the ITO surface, it had satisfactory carryability on the roller system of the liquid crystal display device production line.

EXAMPLE 6

A metal oxide film (SiO$_x$) and ITO film were successively formed on the substrate obtained in Example 5 (IVc) using a sputtering apparatus under the same treatment conditions as in Example 2, to fabricate an electrode substrate (Ve) for a liquid crystal display device.

Although the obtained liquid crystal display device electrode substrate (Ve) exhibited some small concave deformity on the ITO surface, it had satisfactory carryability on a roller system.

EXAMPLE 7

A liquid crystal display device was fabricated by the same method as in Example 3, using the liquid crystal display device electrode substrate obtained in Example 5 (IVe).

The obtained liquid crystal display device (STN type) was capable of providing a clear dot display.

EXAMPLE 8

A liquid crystal display device was fabricated by the same method as in Example 3, using the liquid crystal display device electrode substrate obtained in Example 6 (Ve).

The obtained liquid crystal display device (STN type) was capable of providing a clear dot display.

Comparison 2

A liquid crystal display device was produced with an electrode substrate comprising a 0.3 mm-thick thermoplastic resin plate (PES), a 20 nm-thick $SiO_x$ undercoat film, a 200 nm-thick ITO transparent conductive film and an oriented directional film.

Evaluation

The reliability of the liquid crystal display devices obtained in Examples 3, 4, 7 and 8 and Comparison 2 was evaluated based on the following criteria.

Aging evaluation

Each of the liquid crystal display devices was kept for a prescribed time at 40° C. in a 95% RH atmosphere, and the degree of electrode breakage due to ITO film cracking was evaluated by conduction and by microscopic observation. The occurrence of air bubbles was also evaluated visually and by microscope. The evaluation results are given in Table 1.

Ball-point pen pressure and autoclave evaluation

The tip of a ball-point pen (PR-801, product of Kokuyo, KK.) was pressed against the display center of each fabricated liquid crystal display device at a load of 400 g, heat and pressure were applied for 12 hours in an autoclave apparatus ([55° C., $4.90 \times 10^5$ Pa (5 kgf/cm$^2$)], and the air bubbles and degree of wire breakage immediately after release to atmosphere pressure and at 24 hours thereafter were evaluated visually and by microscope. The evaluation results are given in Table 2.

TABLE 2

Ball-point pen pressure and autoclave evaluation of liquid crystal display device (10 evaluation sample cells)

| Sample | Evaluation Item | Ball-point pen pressure evaluation | | Autoclave evaluation | |
|---|---|---|---|---|---|
| | | Before pressure | After pressure | Directly after release to atmospheric pressure | 24 hrs after |
| Example 3 | Breakage | ○ | ○ | ○ | ○ |
| | Air bubbles | ○ | ○ | ○ | ○ |
| Example 4 | Breakage | ○ | ○ | ○ | ○ |
| | Air bubbles | ○ | ○ | ○ | ○ |
| Example 7 | Breakage | ○ | ○ | ○ | ○ |
| | Air bubbles | ○ | ○ | ○ | ○ |
| Example 8 | Breakage | ○ | ○ | ○ | ○ |
| | Air bubbles | ○ | ○ | ○ | ○ |
| Comparison 2 | Breakage | ○ | × | × | × |
| | Air bubbles | ○ | ○ | ○ | × |

○ — Normal
× — Breakage or air bubbles

INDUSTRIAL APPLICABILITY

The electrode substrate for a liquid crystal display device and the liquid crystal display device according to the present invention have a substrate comprising a transparent resin with a crosslinked structure, a cured coating containing a polyvinyl alcohol for improved gas barrier properties, a siloxane type cured coating containing fine silica particles for an improved hard coat effect, and an ITO film for improved adhesion formed under substrate temperature conditions of not more than 100° C. in order to minimize substrate deformities, in that order, and therefore the heat resistance, abrasion resistance, flatness and gas barrier properties are improved. Furthermore, in the case of a structure wherein a metal oxide film is added between the siloxane

TABLE 1

High humidity aging evaluation of liquid crystal display device (10 evaluation sample cells)

| Sample | Evaluation Item | Time kept at 40° C., 95% RH atmosphere | | | | | |
|---|---|---|---|---|---|---|---|
| | | Initial | 125 hrs | 250 hrs | 500 hrs | 750 hrs | 1000 hrs |
| Example 3 | Breakage | ○ | ○ | ○ | ○ | ○ | ○ |
| | Air bubbles | ○ | ○ | ○ | ○ | ○ | ○ |
| Example 4 | Breakage | ○ | ○ | ○ | ○ | ○ | ○ |
| | Air bubbles | ○ | ○ | ○ | ○ | ○ | ○ |
| Example 7 | Breakage | ○ | ○ | ○ | ○ | ○ | ○ |
| | Air bubbles | ○ | ○ | ○ | ○ | ○ | ○ |
| Example 8 | Breakage | ○ | ○ | ○ | ○ | ○ | ○ |
| | Air bubbles | ○ | ○ | ○ | ○ | ○ | ○ |
| Comparison 2 | Breakage | ○ | × | — | — | — | — |
| | Air bubbles | ○ | × | — | — | — | — |

○ — Normal
× — Breakage or air bubbles type cured coating and the ITO film, the adhesion and gas barrier properties of the ITO film are further improved.

We claim:

1. An electrode substrate for a liquid crystal display device which comprises:

(A) a resin substrate comprising a transparent resin of a copolymer containing not less than 20% by weight of maleimide type monomer units, having a crosslinked structure and having a glass transition temperature of not lower than 160° C. and not higher than 200° C., and with a thickness of 0.1 to 0.8 mm;

(B) a cured coating laminated to said resin substrate comprising a polyvinyl alcohol crosslinked with at least one epoxysilane selected from the group represented by the general formula (1) and a hydrolysate thereof:

$$R^1SiX_3 \quad (1)$$

wherein $R^1$ is an organic group of 1 to 10 carbon atoms having a glycidyl group and X is a hydrolyzable group;

(C) a siloxane cured coating containing fine silica particles aminated to said cured coating of polyvinyl alcohol; and (D) an ITO film laminated to said siloxane cured coating having a grainy surface with grains of a diameter of not larger than 500 nm, formed at a substrate temperature of not higher than 100° C., and having a thickness of 15 to 500 nm.

2. An electrode substrate according to claim 1, wherein said transparent resin of layer A has an elastic modulus at room temperature of at least 200 kg/mm².

3. A liquid crystal display device provided with a pair of said electrode substrates according to claim 1 or claim 2 which have been oriented, and liquid crystals injected between said electrode substrates.

4. A device according to claim 3, wherein said electrode substrates have a transparent conductive film with a thickness of 0.1 to 5 mm.

5. A device according to claim 3 which is a simple-matrix type or active matrix-type liquid crystal display.

6. An electrode substrate according to claim 1, wherein said transparent resin without coloring of layer A has a total light transmittance of at least 60%.

7. An electrode substrate according to claim 1, wherein said transparent resin of layer A is selected from polymethacrylate resins, polyolefin resins, polyether resins, polycarbonate resins, polyester resins, polysulfone resins, polyamide resins, polysulfide resins, unsaturated polyester resins, epoxy resins, melamine resins, phenol resins, diallyl phthalate resins, polyimide resins and polyphosphazene resins.

8. An electrode substrate according to claim 7, wherein said transparent resin is a polyolefin resin.

9. An electrode substrate according to claim 8, wherein said polyolefin resin is a copolymer containing 20 to 98% by weight of maleimide monomer units represented by the general formula (2) below and 2 to 80% by weight of multifunctional monomer units with 2 or more unsaturated groups, and is prepared by polymerizing a composition with a total weight percentage of not less than 30% by weight of said monomer units represented by the general formula (2) and said multifunctional monomer units with 2 or more unsaturated groups:

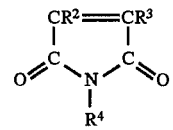

wherein $R^2$ and $R^3$ each independently represent hydrogen, methyl or ethyl, and $R^4$ represents hydrogen or a hydrocarbon group of 1 to 20 carbon atoms; the methyl and ethyl group of $R^2$ and $R^3$ and the hydrocarbon group of $R^4$ may be substituted with any of a variety of substituents including halogens such as fluorine, chlorine and bromine, cyano groups, carboxyl groups, sulfonate groups, nitro groups, hydroxy groups and alkoxy groups.

10. An electrode substrate according to claim 1, wherein said polyvinyl alcohol has an average polymerization degree of 250 to 3000.

11. An electrode substrate according to claim 1, wherein said cured coating of polyvinyl alcohol contains fine inorganic particles.

12. An electrode substrate according to claim 11, wherein said fine inorganic particles are a colloidally dispersed sol.

13. An electrode substrate according to claim 11, wherein said fine inorganic particles are present in the transparent coating in an amount of not less than 1% by weight and not more than 80% by weight.

14. An electrode substrate according to claim 11, wherein the average particle size of said fine inorganic particles is 1 to 200 nm.

15. An electrode substrate according to claim 1, wherein said siloxane cured coating contains fine silica particles and a silicone macromolecule.

16. An electrode substrate according to claim 15, wherein said silicone type macromolecule is a polymer obtained from either an organic silicon compound represented by the following general formula (3) or a hydrolysate thereof:

$$R^5_a R^6_b SiX_{4-a-b} \quad (3)$$

wherein $R^5$ is an organic group of 1 to 10 carbon atoms, $R^6$ is a hydrocarbon group or halogenated hydrocarbon group of 1 to 6 carbon atoms, X is a hydrolyzable group, and a and b are 0 or 1.

17. An electrode substrate according to claim 15, wherein said siloxane type cured coating further contains an acrylic resin, a polyurethane resin, an epoxy resin, a melamine resin, a polyolefin resin, a cellulose, a polyvinyl alcohol resin, a urea resin, a nylon resin or a polycarbonate resin.

18. An electrode substrate according to claim 15, wherein said fine silica particles are present in the transparent coating in an amount of not less than 1% by weight and not more than 80% by weight.

19. An electrode substrate according to claim 15, wherein the average particle size of said fine silica particles is 1 to 200 nm.

20. An electrode substrate according to claim 1 following layer D between said layers C and E
    further comprising a metal oxide film laminated between said siloxane coating and said ITO film, said metal oxide film comprising a metal selected from Si, Al and Ti, formed at a substrate temperature of not higher than 100° C. and having a thickness of 10 to 200 nm.

21. An electrode substrate according to claim 20, wherein the thickness of said metal oxide film is 10 to 120 nm.

* * * * *

UNITED STATES PATENT AND TRADEMARK OFFICE
CERTIFICATE OF CORRECTION

PATENT NO. : 5,645,901
DATED : July 8, 1997
INVENTOR(S) : Shunsei Fukuchi, Makoto Iwamoto, Akihiro Kitabatake, Masahiro Tanimoto, Masaki Maekawa & Naoki Shimoyama It is certified that error appears in the above-indentified patent and that said Letters Patent is hereby corrected as shown below:

In Column 20, line 54, please delete "following"; and line 55, please delete "layer D between said layers C and E".

Signed and Sealed this

Thirtieth Day of December, 1997

Attest:

BRUCE LEHMAN

Attesting Officer

Commissioner of Patents and Trademarks